(12) United States Patent
Ishii et al.

(10) Patent No.: US 6,979,134 B2
(45) Date of Patent: Dec. 27, 2005

(54) OPTICAL COMMUNICATION MODULE

(75) Inventors: Yorishige Ishii, Yamatotakada (JP);
Toshiyuki Matsushima, Nara (JP);
Hideaki Fujita, Shiki-gun (JP);
Yoshifumi Iwai, Kashihara (JP); Yukio Kurata, Tenri (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 696 days.

(21) Appl. No.: 09/920,873

(22) Filed: Aug. 2, 2001

(65) Prior Publication Data

US 2002/0039220 A1 Apr. 4, 2002

(30) Foreign Application Priority Data

Aug. 4, 2000 (JP) ........................................ 2000-237275

(51) Int. Cl.$^7$ ................................................. G02B 6/36
(52) U.S. Cl. ........................................... 385/88; 385/53
(58) Field of Search ............................... 385/78, 84, 88, 385/92, 53

(56) References Cited

U.S. PATENT DOCUMENTS

| | | | | |
|---|---|---|---|---|
| 4,199,222 A | * | 4/1980 | Ikushima et al. | 385/92 |
| 4,575,181 A | * | 3/1986 | Ishikawa | 385/31 |
| 5,485,316 A | * | 1/1996 | Mori et al. | 359/708 |

FOREIGN PATENT DOCUMENTS

| | | | | |
|---|---|---|---|---|
| JP | 55-003688 | 1/1980 | | |
| JP | HEI 9(1997)-211264 | 1/1996 | ............ | G02B/6/38 |
| JP | 10-123374 | 5/1998 | | |
| JP | 11(1999)-237535 | 8/1999 | ............ | G02B/6/42 |
| JP | 11(1999)-352365 | 12/1999 | ............ | G02B/6/42 |
| JP | 2000-162479 | 6/2000 | | |

OTHER PUBLICATIONS

Office Action dated Jun. 17, 2003 in corresponding Japanese patent application No. P2000–237275, with English translation.

* cited by examiner

*Primary Examiner*—Jennifer Doan
(74) *Attorney, Agent, or Firm*—David G. Conlin; Peter J. Manus; Edwards & Angell LLP (57) ABSTRACT

An optical communication module including: an emission member for emitting a transmission light beam; and a connection member for detachably connecting an optical fiber for external communication with the emission member, the connection member including a tubular accommodation part for coaxially receiving and fixing an end of the optical fiber to be connected, wherein the emission member and the connection member are arranged such that the transmission light beam intersects with an optical axis of the optical fiber at a predetermined angle to enter an end face of the optical fiber when the optical fiber is connected and the transmission light beam collides with an inner wall of the accommodation part when the optical fiber is detached.

4 Claims, 8 Drawing Sheets

(a) ▲ LD OUTPUT BEFORE ENTERING POF NOT SCATTERED
(b) ■ LD OUTPUT BEFORE ENTERING POF 1/2 SCATTERED
(c) ● LD OUTPUT BEFORE ENTERING POF 3/4 SCATTERED

OPTICAL COMMUNICATION MODULE

CROSS-REFERENCE TO RELATED APPLICATION

This application is related to Japanese application No. 2000-237275 filed on Aug. 4, 2000, whose priority is claimed under 35 USC §119, the disclosure of which is incorporated by reference in its entirety.

BACKGROUND OF THE INVENTION

1. Field of the Invention

The present invention relates to an optical communication module capable of transmitting an optical signal through an optical fiber. In particular, it relates to an optical communication module which can be utilized for domestic communication, electronics-to-electronics communication, LAN (Local Area Network) and the like by using a multimode optical fiber such as a plastic optical fiber as a transmission medium.

2. Description of Related Art

In the field of an optical communication module for transmitting optical signals using an optical fiber as a transmission medium, an LED has been utilized as a light source for low-speed communication generally for indoor use running at a transmission speed of 100 Mbps or lower. For high-speed communication mostly for major lines running at a speed of Gbps order, an LD (semiconductor laser) has been used as a light source.

In the case of using the LD, though it is not so problematic in using the LED, a light beam emitted from the LD is leaked out of the module when a connector of the optical fiber is detached and the leaked light beam may possibly damage an eye and skin due to coherence thereof. Therefore, use of the LD is strictly regulated by JIS or the like. Accordingly, to restrict the emitted light beam within the module even if the connector is detached, various ideas have been made, such as (1) mechanically preventing the leakage of the light beam emitted from the LD by providing a shutter and (2) sensing the removal of the connector to electrically turn off the LD.

Japanese Unexamined Patent Application No. Hei 9 (1997)-211264 discloses an example of the above idea (1). This will be described below with reference to FIGS. 17 and 18.

Figure 17:
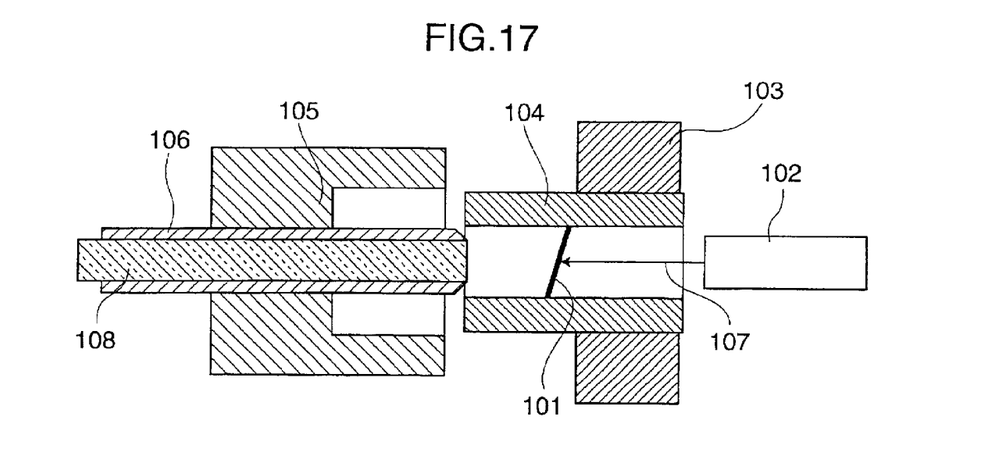
FIG. 17 is a view for illustrating a structure of an optical communication module according to prior art.
Figure 18:
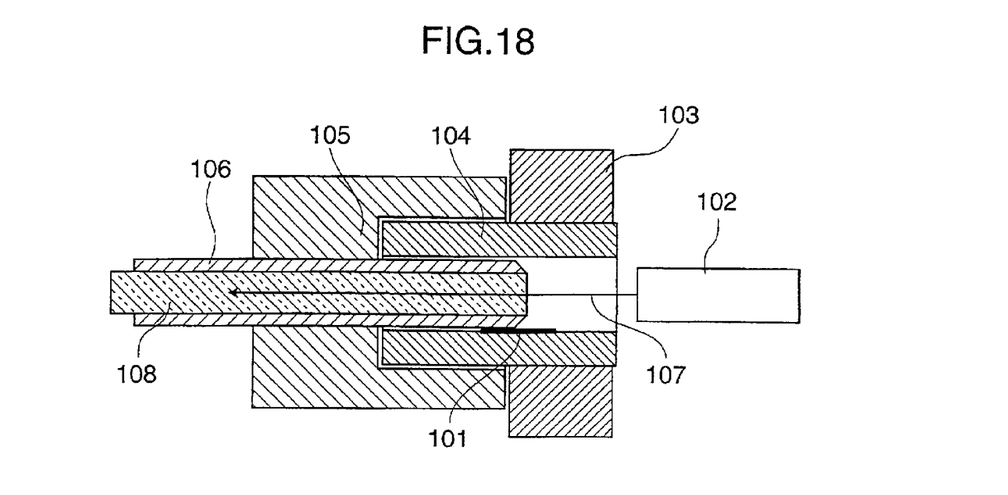
FIG. 18 is a view for illustrating the structure of the optical communication module according to prior art.

FIGS. 17 and 18 show a shutter 101 for preventing the leakage of a transmission light beam, which is a fundamental constituent of the invention, an emitting member 102 for emitting a transmission light beam, a receptacle 103, a cylinder 104 for fixing a ferrule, a connector 105 of an optical fiber, a ferrule 106, and a transmission light beam 107 to be coupled with an optical fiber 108.

The shutter 101 is formed of an elastic material such as phosphor bronze. As shown in FIG. 18, when the connector 105 is attached, the shutter 101 is pushed down to open by the optical fiber 108 without inhibiting the insertion of the optical fiber. The transmission light beam 107 is coupled with the optical fiber 108 enclosed by the ferrule 106.

When the connector 105 is detached, the shutter 101 returns to its original position by spring force and blocks an optical path of the transmission light beam. Thus, the transmission light beam is prevented from emitting to the outside of the module.

In recent years, high-speed communication at several hundred Mbps is required even for indoor electronics-to-electronics communication in the home due to the spread of IEEE 1394 and ATM. According to this, the LD is becoming more popular than the LED as the light source. In this case, the attaching/detaching of the connector is repeated many times incomparably to the cases of the major lines and the interoffice LAN. The above-described conventional technique utilizing the mechanical means for preventing the light leakage becomes unreliable when the connector is repetitively attached/detached. Further, in view of production costs, it is not preferable to provide a shutter or the like in a fine optical communication module.

The method of electrically sensing the removal of the connector may be more reliable than the above-described mechanical method. However, it has no 100% guarantee of reliability and is unpreferable in view of fail-safe, a fundamental idea for the safety of human body. Further, the method also requires considerable costs.

Alternatively, it may be possible to constantly decrease the output of the LD. However, an amount of the transmission light beam coupled with the optical fiber is reduced, which decreases the SN rate and hinders long-distance transmission.

SUMMARY OF THE INVENTION

The present invention provides an optical communication module comprising: an emission member for emitting a transmission light beam; and a connection member for detachably connecting an optical fiber for external communication with the emission member, the connection member including a tubular accommodation part for coaxially receiving and fixing an end of the optical fiber to be connected, wherein the emission member and the connection member are arranged such that the transmission light beam intersects with an optical axis of the optical fiber at a predetermined angle to enter an end face of the optical fiber when the optical fiber is connected and the transmission light beam collides with an inner wall of the accommodation part when the optical fiber is detached.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

According to the present invention, the emission member for emitting the transmission light beam may be comprised of, for example, a semiconductor laser and a transmission optical system.

The connection member for connecting the optical fiber may be a receptacle for receiving and connecting an end of the optical fiber.

The inner wall of the accommodation part may preferably be designed to scatter the transmission light beam which collides therewith.

Further, the accommodation part may preferably include on its inner wall: a light scattering member for scattering the transmission light beam which collides therewith; a light absorbing member for absorbing the transmission light beam which collides therewith; or a concave portion for reflecting and absorbing the transmission light beam which collides therewith.

The end of the optical fiber preferably has an end face which is orthogonal to the optical axis of the optical fiber. The predetermined angle at which the transmission light beam intersects with the optical axis of the optical fiber is preferably smaller than $\sin^{-1}(n1^2-n2^2)^{1/2}$ where a core and a clad of the optical fiber have refractive indices of n1 and n2, respectively.

The end of the optical fiber may have an end face which forms an acute angle with a plane orthogonal to the optical axis of the optical fiber. Alternatively, the end of the optical fiber may form a convex lens.

Now, description will be made to a safety standard for use of a semiconductor laser.

The safety standard for the use of the semiconductor laser is established by safety codes such as ANSIZ 136.1, IEC, JIS C6802 and the like. Fundamentally, the safety standard is determined based on a threshold value of damages to human body, i.e., to eye and skin, and substantially unified among these standard codes. In this application the JIS is adopted.

The threshold value varies depending on emission wavelength and oscillation of a laser source, or whether the laser source is a point light source or a diffusion light source. The threshold value is determined as a $1/10$ value of intensity of a laser beam which causes the damages with 50% probability, i.e., an MPE (Maximum Permissible Exposure) value. The MPE value for the eye and that for the skin are different. Further, the MPE for the eye varies depending on whether the light is observed as a light beam or scattered light.

The scattered light signifies light observed at a viewing angle greater than a critical viewing angle $\alpha_{min}$. In general, where the optical fiber connector is detached, light from the semiconductor laser is emitted to the outside at low NA via an optical system and thus observed as the light beam. On the other hand, light emitted from the optical fiber is observed as the scattered light because an end face of the optical fiber is recognized as a Gaussian-distributed surface light source.

As a criterion for measurement or calculation of a light exposure amount, critical NA is utilized. This is recognized as a diameter of a round region used for calculating averages of irradiance and exposure. In this application, the NA of 7 mm is adopted because discussion is made on safety of the eye, in particular on light in a wavelength range of 400 to 1400 nm.

Where a repetitive pulse laser or a modulation laser is used as the emission member of the present invention, the MPE value is calculated by a calculation method described below.

Since a wavelength, an amount of energy and pulse characteristics of a laser beam may possibly vary in wide ranges, respectively, problems involved in the use of the laser beam may also vary in a wide range. Accordingly, a common safety standard cannot be adapted equally to various lasers and thus the lasers are elaborately divided into classes in accordance with AEL (Accessible Emission Limit).

Lasers divided into Class 1 defined by the AEL are fundamentally safe, and their output levels never exceed the maximum permissible exposure under whatever conditions. Lasers that are technically designed not to exceed the MPE are also included in Class 1. Lasers divided into Class 2 are those which work under CW (continuous wave) or pulse and emit visible light (wavelength of 400 to 700 nm) at low output. Output power or energy of the Class 2 lasers until 0.25 seconds of an emitting time must be controlled to the corresponding AEL of the Class 1 lasers. In the case of the CW laser, the upper limit of the output power of the Class 2 laser for the emitting time of 0.25 or more seconds is 1 mW.

As a referential time for classifying the lasers emitting a laser beam of 400 nm or more to be discussed herein, a reduced duration time of 1000 seconds is adapted, if the laser beam irradiation is not looked into for use, in view of the function or design of the lasers.

In the present invention, the lasers are classified in accordance with the safety of the eye so that they are not harmful to the skin since a threshold value of the damages to the skin is higher by several orders than that to the eye. That is, the safety is discussed under the condition of the strictest threshold value. Regarding the optical fiber connector which is frequently attached/detached by a user, consideration must be given to the fact that the laser beam enters the eye when the connector is detached. Accordingly, it is necessary to control an amount of the laser beam lower than that defined in Class 1 or 2, or to provide a mechanical or electric shutter to block the laser beam leaking to the outside. The present invention corresponds to the former.

In recent years, attention has been paid to POF which is applicable to the home network. In view of a wavelength passband, a semiconductor laser emitting a laser beam of 650 nm is utilized as a light source of the POF. For example, an amount of light enters the eye is calculated under the conditions of a transmission rate of 250 Mbps and a NRZ code.

In general, a transmission LD is pulse-modulated so that a rule for the pulse lasers needs to be adapted. An MPE value with respect to light of 400 to 1400 nm is determined under the strictest conditions selected from the following (a), (b) and (c). With respect to light of other wavelengths, a stricter one of the following conditions (a) and (b) is used.
(a) Exposure amount of every single pulse in a series of pulses must not exceed the MPE.
(b) Average irradiance of a series of pulses during a pulse duration time T must not exceed the MPE of a single pulse lasting for the pulse duration time T.
(c) Exposure amount of every single pulse in a series of pulses must not exceed $MPE_{train}$ calculated by the following equation.

$$MPE_{train} = MPE_{single} \times N^{0.25}$$

$MPE_{train}$: Exposure amount of a single pulse in a series of pulses
$MPE_{single}$: MPE of a single pulse
N: the number of pulses expected during exposure The above conditions (a), (b) and (c) are converted to irradiation power. Provided that an AEL value corresponding to an emitting time t (pulse width) is AEL (t), an amount of light corresponding thereto is Pmax (t), a duration time of a series of pulses is T second, the number of pulses during T is N, an average irradiation power (average light amount) of the series of pulses is Pa, and an amount of incident light permissible to a single pulse in the series of pulses is P, the above (a), (b) and (c) will be as follows.

(a) $P \leq Pmax\ (t) = AEL\ (t)/t$ \hfill (1)

(b) $Pa \leq Pmax\ (T) = AEL\ (T)/t$ \hfill (2)

$\therefore P = Pa \times T/(N \times t) \leq AEL\ (T)/(N \times t)$ (c) $P \leq (AEL(t) \times N^{0.25})/t$ \hfill (3)

Since the laser beam is transmitted at a transmission rate of 250 Mbps under a NRZ cord, a frequency f thereof will be 125 MHz. In general, the signal is not always transmitted as a repetition of 0101 . . . , but sometimes it may be transmitted as 0 or 1 continued 5–10 times in a row. In this application, employed is a code wherein 0 or 1 is continued 5 times at the maximum. The minimum pulse width is 4 nsec and the maximum pulse width is 20 nsec. Accordingly, it is considered that pulses of 0101 . . . for an average pulse width of 12 nsec are repeated at 125 MHz. Where T is 1000 seconds, the number of pulses N will be 4.17 E10.

Then, the maximum permissible exposure (MPE) is calculated.

Figure 15:
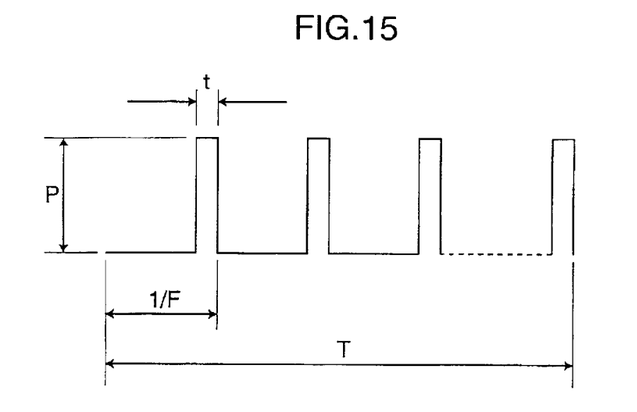
FIG. 15 is a view for illustrating an example of a method of converting a laser output under pulse driving.
Figure 16:
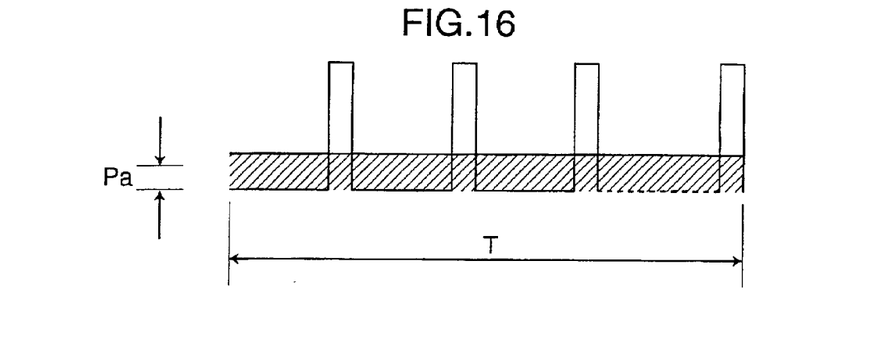
FIG. 16 is a view for illustrating an example of a method of converting a laser output under pulse driving.

FIGS. 15 and 16 each show an example of a method of converting the laser output under pulse driving. In the figures, T is time, F is frequency, P is power, Pa is average power, and t is pulse time.

In the case of (a), calculation is performed with reference to FIG. 15.

When an AEL value corresponding to t=12 nsec is substituted into the above equation (1), obtained is $$P \leq AEL(t)/t = 7 \times (10^{-4}) \times (t^{-0.25}) = 66.9\ mW$$

In the case of (b), calculation is performed with reference to FIG. 16.

By substituting an AEL value corresponding to T=1000 sec, as well as a pulse width and t during 1000 sec into the equation (2), obtained is $$P \leq AEL(T)/(N \times t) = 2 \times AEL\ (T)/T = 0.246\ mW$$

In the case of (c), the number of pulses N during 1000 sec is substituted into the equation (3) to provide $$\begin{aligned}P &\leq AEL(t) \times (N^{-0.25})/t \\ &= 7 \times 10^{-4} \times (t^{0.75})/t \times (N^{-0.25}) \\ &= 7 \times 10^{-4} \times (t^{-0.25})/t \times (N^{-0.25}) \\ &= 0.15\ mW\end{aligned}$$

Accordingly, the laser irradiation is controlled by $AEL_{train}$. In case where the optical fiber connector is detached and the transmission light beam enters the eye, the amount of incident light needs to be controlled to 0.15 mW or less.

Figure 13:
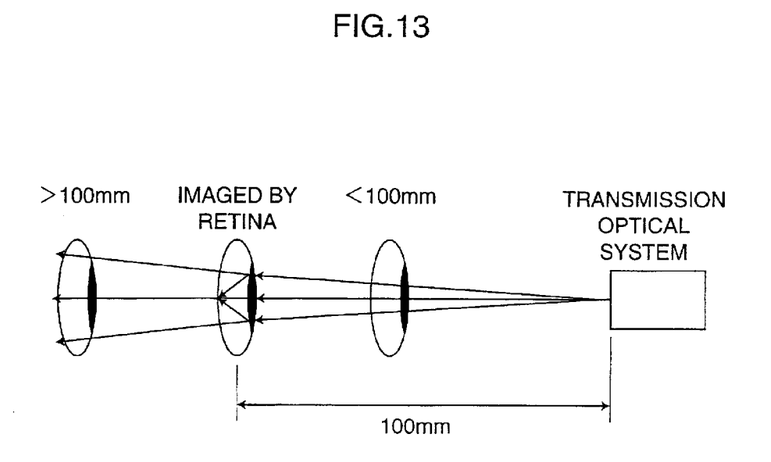
FIG. 13 is a schematic view for illustrating a relationship between a light source and an amount of light for forming an image in retina.

Now, definition of the amount of light that enters the eye will be made with reference to FIG. 13. The amount of light enters the eye signifies an amount of light which is imaged by retina. It does not indicate controlling the laser output to 0.15 mW. Light of a wavelength of 400 nm or lower, or 1400 nm or higher does not reach the retina so that it can be ignored. Further, it is also unproblematic where the laser beam emitting part and an eye are apart from each other because the light amount reaching the retina is reduced. In the case where the distance between them is too small, the light is not imaged by the retina so that it also can be ignored.

In general, the definition is made by an amount of light incident on an eye aperture of 7 mm Ø located at a distance of 100 mm from the laser beam emitting part. Accordingly, light emitted from a small light source and diffused at a small angle is more harmful than light emitted from a large light source or diffused at a great angle. In this case, the light source is substantially a point light source, so that the amount of light incident on the eye varies depending on excitation NA of the light entering the optical fiber, as shown in FIG. 14.

At a position of 100 mm from the light source, the amount of light imaged by the retina is maximized. Since the eye aperture (the size of pupil) through which the light incident on the retina is 7 mm, the maximum amount of light incident on the aperture of 7 mm Ø at a distance of 100 mm from the light source is controlled to 0.15 mW or lower by adjusting an irradiation angle (excitation NA) or an output of the light source.

Figure 14:
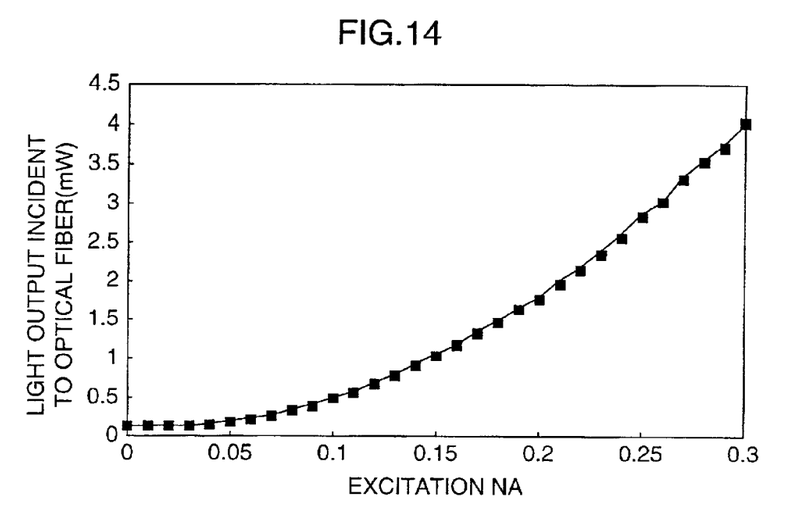
FIG. 14 is a graph for illustrating a relationship between an excitation NA of the optical fiber and a laser output for controlling an amount of light entering an eye lower than a predetermined value.

From the conversion of the amount of light incident on the eye 0.15 mW to the laser output, a relationship between the excitation NA of the laser beam and an output to the optical fiber is obtained as shown in FIG. 14. As seen in FIG. 14, the laser output cannot be restricted to the level of Class 1 or 2 unless the laser output itself is reduced or the excitation NA is increased.

On the other hand, provided that the structural NA of the optical fiber is 0.3 and the diameter of the POF is 1 mm, the amount of light emitted from the optical fiber when it is detached from the socket is calculated by the following equation:

(7: eye aperture)$^2$/(60: diameter of irradiated light at the eye)$^2$× (0.012: NA converted value of light receiving angle of the eye)$^2$)/(0.3: structural NA of the optical fiber)$^2$)=0.00002.

Since the light emitted from the optical fiber is observed as scattered light so that an AEL value is obtained from the following equation:

$$AEL = 6636000 \text{ J} \cdot \text{m}^{-2} \cdot \text{sr}^{-1}$$
$$= 0.00255 \text{ J} \cdot (\text{area of aperture of 7 mm } \emptyset) -$$
$$2 \cdot (10^{-5} \text{ sr})^{-1}$$

since $T = 1000$, $$AEL = 0.00255 \times 10^{-3} \cdot (\text{area of aperture of 7 mm } \emptyset) -$$
$$2 \cdot (10^{-5} \text{ sr})^{-1}$$
$$= 0.00255 \text{ mW} \cdot (\text{area of aperture of 7 mm } \emptyset) -$$
$$2 \cdot (10^{-5} \text{ sr})^{-1}$$
$$= 0.00255 \times 50000$$
$$= 127.5 \text{ mW}$$

At the end of the optical fiber, the light emission of 127.5 mW is permissible. This is not harmful at all, so that safety of the eye from the light emitted from the socket must be ensured.

EXAMPLES

Hereinafter, the present invention will be detailed by way of examples with reference to the figures. However, the invention is not limited thereto.

Example 1

Figure 1:
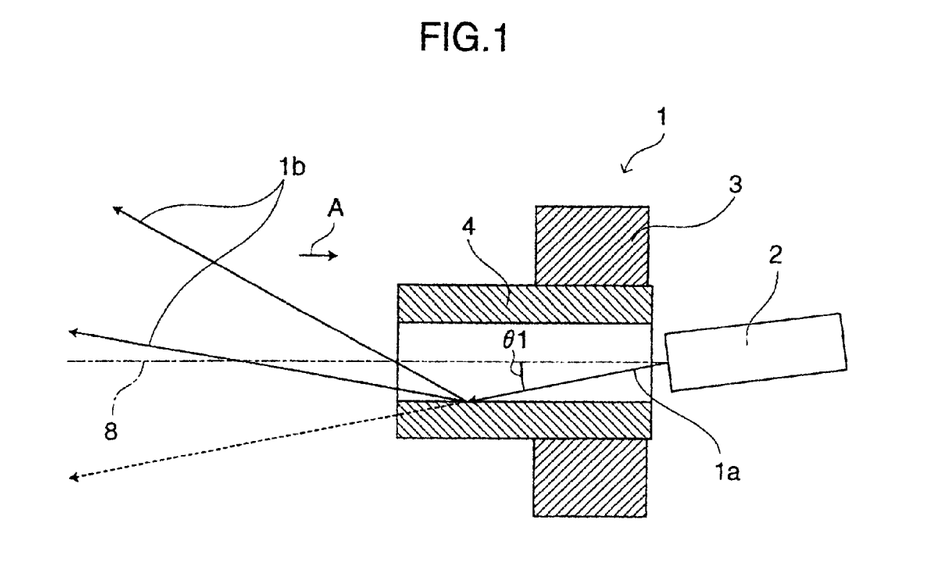
FIG. 1 is a schematic sectional view for illustrating an optical communication module according to Example 1 of the present invention.

Referring to FIG. 1, an optical fiber module 1 is provided with an emission member 2 for emitting a transmission light beam including a semiconductor laser and a transmission optical system, a receptacle 3 and a cylindrical member 4 attached to the receptacle 3 for fixing a ferrule 6. A transmission light beam 1a emitted by the semiconductor laser in the emission member 1 is inclined at an angle $\theta1$ with respect to an optical axis 8 of an optical fiber to be mentioned later. An extended line of the transmission light beam 1a emitted from the semiconductor laser intersects with the cylindrical member 4.

With the above-described structure, the transmission light beam 1a which is inclined at the angle $\theta1$ with respect to the optical axis of the optical fiber is reflected by the cylindrical member 4 to be scattered to the outside as indicated by arrows 1b. The transmission light beam is scattered in accordance with the configuration and material of the cylindrical member 4, so that an amount of light entering the eye, more precisely, an amount of light imaged by retina is greatly reduced. As a result, the transmission light beam can be maintained in a great amount without providing a mechanical means such as a shutter and intentionally decreasing the amount of the transmission light beam.

Figure 2:
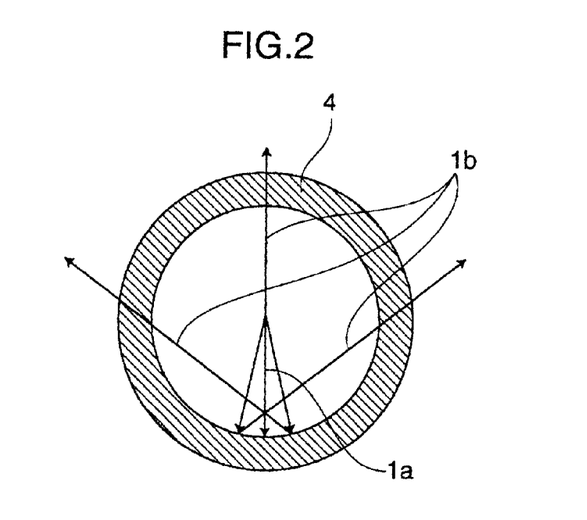
FIG. 2 is a partial front view of the optical communication module shown in FIG. 1.

FIG. 2 shows a path of a main light beam emitted from the semiconductor laser. A main light beam 1a from the semiconductor laser of the emission member 2 is reflected by the cylindrical member 4 and scattered as indicated by arrows 1b. By inclining the light beam so as to be reflected by the cylindrical member 4, the light beam is spread out at a greater angle before entering the eye, which inhibits imaging of the light greater than a permissible amount by the retina.

The above structure will be further detailed. Hereinafter, explained is the reason why the transmission light beam 1a emitted from the semiconductor laser should be reflected by the cylindrical member when the optical fiber is detached.

Semiconductor lasers generally show an oval intensity distribution. In this case, a semiconductor laser showing half value angles of //8° and ⊥30° is used. Explanation is made to a permissible LD output where a larger angle after NA conversion by an optical system, i.e., the angle in the ⊥ direction, is θ.

Figure 3:
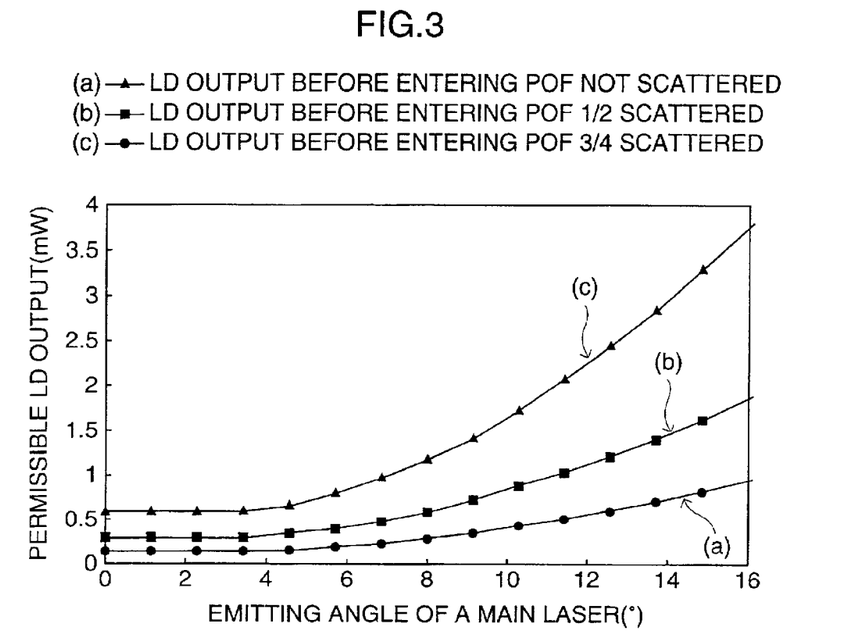
FIG. 3 is a graph for illustrating a relationship between an emitting angle of a main laser beam and a permissible LD output according to the present invention.

FIG. 3 shows a relationship between an emitting angle of a main laser beam and a permissible LD output. As described above, a permissible light amount entering to the eye of an aperture of 7 mm Ø located at a distance of 100 mm from the semiconductor laser emitting part is 0.15 mW. As the emitting angle of the transmission laser beam becomes larger, the permissible light amount increases as indicated by a curve (a).

A curve (b) shows the result of scattering ½ of the emitted laser beam. When the laser beam is scattered, the permissible LD output increases, which allows an increase of the LD output. Further, where the laser beam is more inclined than the case of (b) with respect to an optical axis of the fiber to scatter ¾ of the laser beam on the cylindrical member 4, the permissible LD output further increases.

Thus, where at least a part of the laser beam is reflected on the cylindrical member 4, the laser beam emitted to the outside can be reduced even when the optical fiber is not connected to the receptacle. In particular, with a construction in which the optical axis of the transmission light beam 1a intersects with the cylindrical member 4, the amount of light emitted to the outside can be reduced to about ½, which instead allows increasing the laser output.

Figure 4:
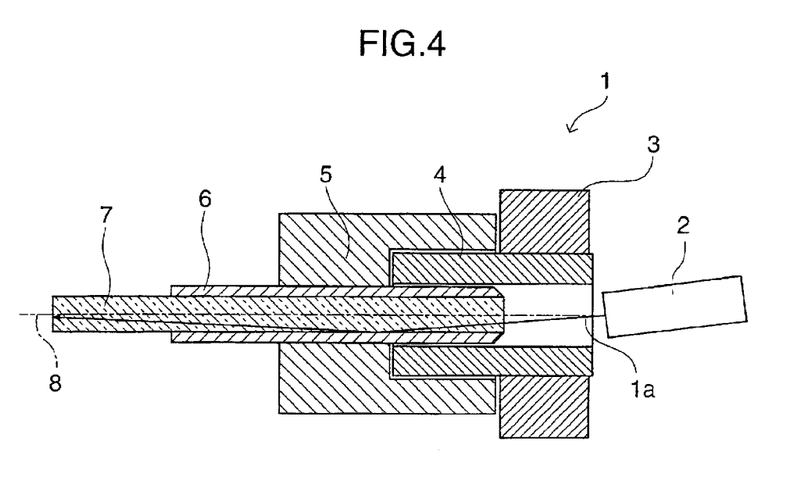
FIG. 4 is a schematic sectional view for illustrating the optical communication module of the present invention connected with an optical fiber.

Now, description is made to the case where the optical fiber connector 5 is connected to the receptacle 3 with reference to a schematic sectional view shown in FIG. 4.

Where the connector 5 is attached to the receptacle 3, the transmission light beam is refracted at a coupling position with the optical fiber 7 and inclined at a certain angle with respect to the optical axis of the fiber as shown in FIG. 4. In FIG. 4, an end face of the optical fiber is configured orthogonally to the optical axis thereof. Provided that refractive indices of a core and a clad of the optical fiber are n1 and n2, respectively and the condition of $\theta1 < \sin^{-1}(n1^2 - n2^2)^{1/2}$ is satisfied, the transmission light beam can be transmitted through the optical fiber 7.

Figure 5:
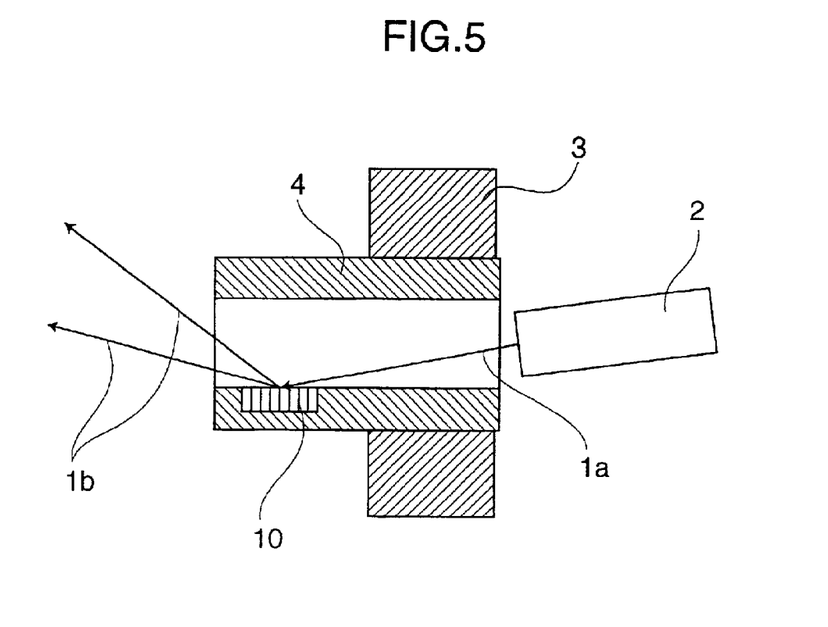
FIG. 5 is a schematic sectional view for illustrating the optical communication module according to Example 1 of the present invention.

The cylindrical member 4 of the receptacle described above is preferably made of metal such as stainless steel since it may be served as a receiving part for the optical fiber connector 5. However, reflectance of metal is as relatively high as 60–85%, it is important to design it to a shape which allows scattering of the transmission light beam. Further, as shown in FIG. 5, it may also be possible to provide a part 10 suitable for light scattering only in a region reflecting the transmission light beam.

Example 2

Figure 6:
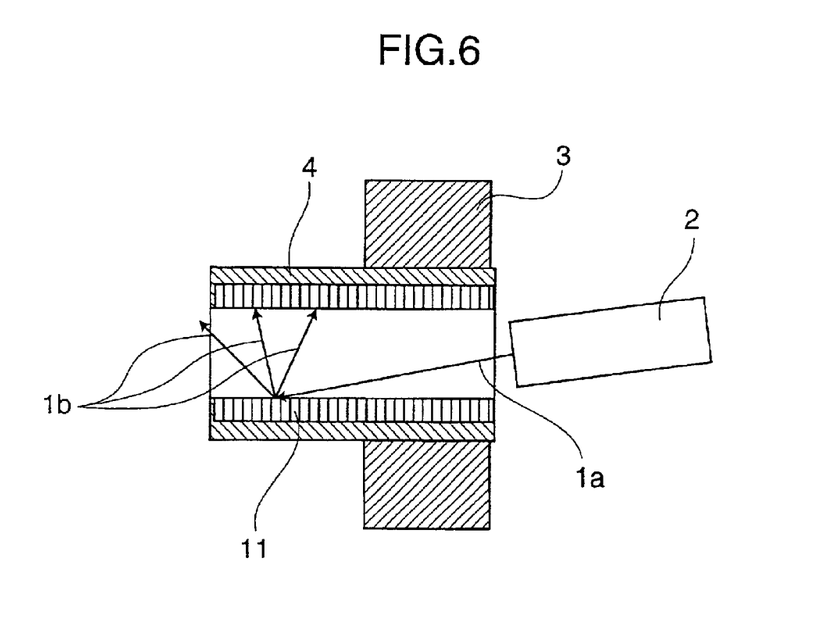
FIG. 6 is a schematic sectional view for illustrating an optical communication module according to Example 2 of the present invention.

The above Example 1 utilizes an inner wall of the cylindrical member of the receptacle, i.e., a part receiving the optical fiber, in order to scatter the transmission light beam. However, where the optical fiber is POF or the like and alignment of the optical axes is not required, the inner wall of the cylindrical member may be roughened so that the transmission light beam is scattered. FIG. 6 shows a structure where a light scattering member 11 is formed on the inner wall of the cylindrical member 4. If the cylindrical member 4 is a molded resin article, the roughness is given to the inner wall during the formation thereof. If the cylindrical member is made of metal, surface treatment such as matte plating may be given so that a coating for scattering the transmission light beam is provided.

Figure 7:
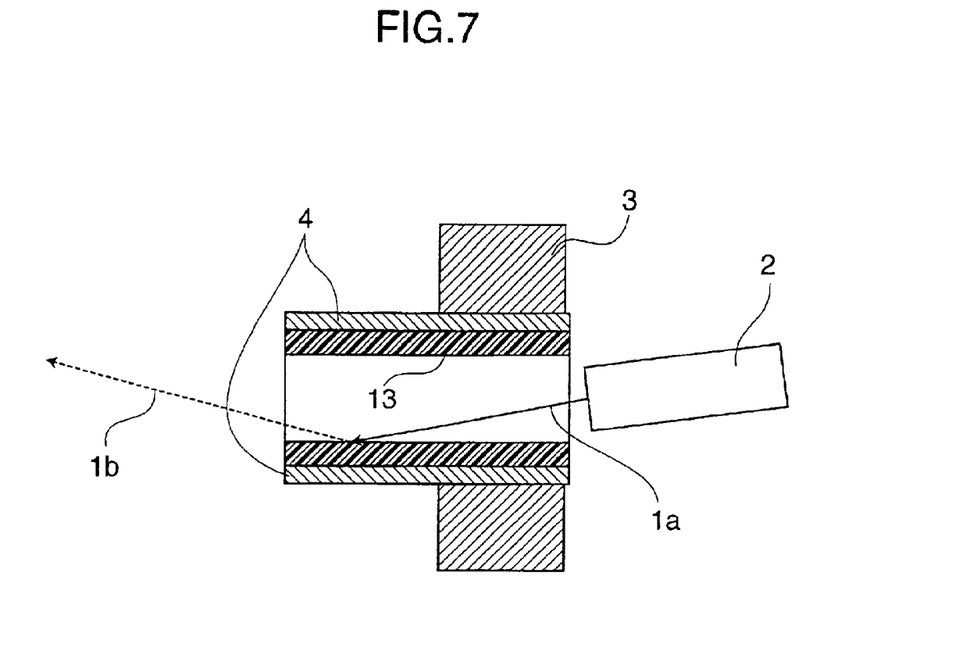
FIG. 7 is a schematic sectional view for illustrating a variation of the optical communication module according to Example 2 of the present invention.

FIG. 7 shows a structure where a light absorbing material 13 is applied to the inner wall of the cylindrical member 4 to absorb the light form the LD. If the light absorbing material 13 is comprised of black epoxy containing carbon (reflectance of about 5%), an amount of the transmission light beam 13 leaking to the outside can be reduced to about $\frac{1}{10}$, which increases the permissible LD output with respect to the eye ten times higher than that of the curve (a) shown in FIG. 3.

In place of the light absorptive black epoxy resin, metals having high light absorbency such as Ni, acrylic resins containing pigments or the like, or ceramics such as zirconia may be used. With the zirconia ceramics, the receptacle may be provided with both accuracy and strength.

It is also possible to form a light absorbing member 13 only in a region reflecting the transmission light beam 1a. For example, this is realized by insertion molding. A broken arrow 1b in FIG. 7 indicates that the amount of the transmission light beam is reduced through absorption. A light amount Po leaking outside is calculated by Po=P×r wherein a reflectance of the light absorbing member shown in FIG. 7 is r and a light output from the emitting member is P.

Example 3

Figure 8:
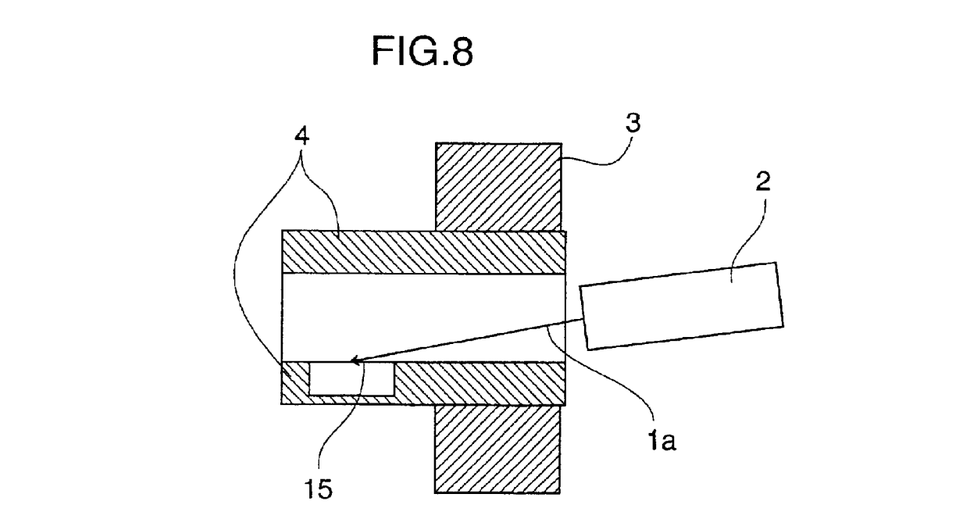
FIG. 8 is a schematic sectional view for illustrating the optical communication module according to Example 3 of the present invention.

FIG. 8 shows a structure where a hollow 15 for blocking the transmission light beam is formed in the cylindrical member 4. Example 3 shows a structure where the leakage of the transmission light beam to the outside is geometrically prevented when the optical fiber connector is detached.

In a state where the optical fiber connector is detached, the transmission light beam 1a enters the hollow 15 within the receptacle and the light beam 1a is blocked by the sidewalls of the hollow 15. Thus, the transmission light beam 1a does not directly leak to the outside.

Figure 9:
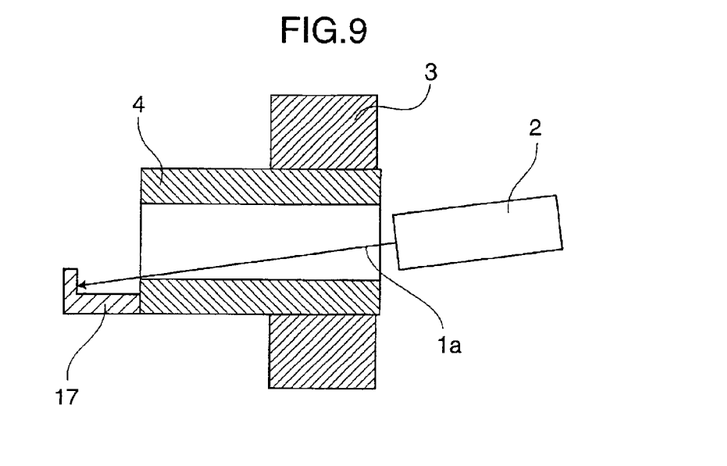
FIG. 9 is a schematic sectional view for illustrating a variation of the optical communication module according to Example 3 of the present invention.

FIG. 9 shows a structure where a light blocking part 17 is provided outside the receptacle to prevent the direct leakage of the transmission light beam. The essential thing is to provide a geometric means to prevent the leakage of the transmission light beam without hindering the insertion of the optical fiber connector.

Example 4

Figure 10:
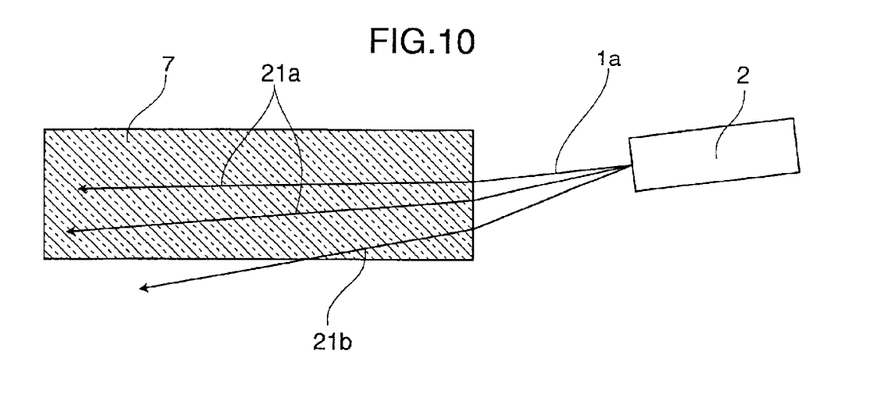
FIG. 10 is a view for illustrating a light beam incident on an orthogonal end face of an optical fiber.
Figure 11:
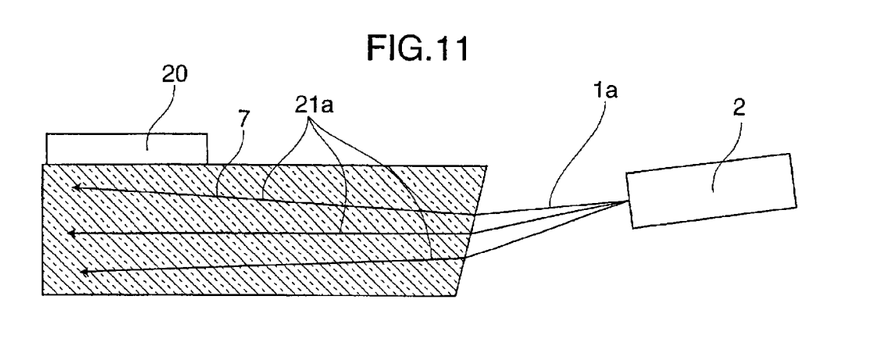
FIG. 11 is a view for illustrating a light beam incident on an inclined end face of an optical fiber according to the present invention.

The present invention is not effectual for a single mode quartz fiber for major lines where the connector is hardly detached. The invention is most effectively applied to POF utilized for digital audio equipment and the like. Since the POF has relatively large diameter and structural NA, the transmission light beam which is obliquely incident on the fiber is easily coupled with a transmission mode of the fiber (a light beam 21a shown in FIG. 10). However, as shown in FIG. 10, the transmission light beam may partially leak as indicated by a light beam 21b. In such a case, an end face of the fiber is inclined as shown in FIG. 11. Accordingly, the transmission light beam entering the fiber obliquely to the optical axis of the fiber is refracted by the inclined end face which functions as a prism. Therefore the transmission light beam will be transmitted horizontally after entering the fiber.

The optical fiber having the inclined end face becomes ineffective unless the connector is inserted along a certain direction, so that a key 20 for preventing erroneous insertion is required to determine the position.

Figure 12:
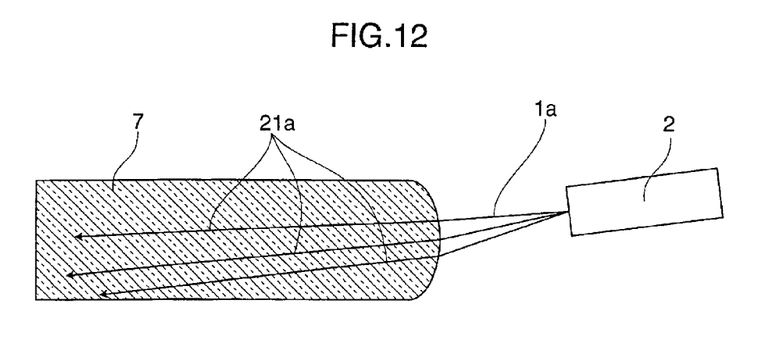
FIG. 12 is a view for illustrating a light beam incident on a rounded end face of an optical fiber according to the present invention.

FIG. 12 shows a structure utilizing the POF having a rounded end face. With such a rounded end face, the light beam at the periphery which tends to leak is largely refracted, i.e., lens effect is obtained when the fiber is connected. This is effective in POF and HCPF having relatively large diameter and NA. Alternatively, the end face of the optical fiber may be designed into a conical shape. With the conical end face, the transmission light beam needs to be decentered, but this is not problematic for the POF having a diameter of 0.5 to 1 mm.

Where a GI (Graded Index) fiber or a fiber made of quartz is used as the optical fiber, the coupling of light is difficult because these fibers have small NA and small difference in refractive index between the periphery portion of the fiber core and the clad. The diameter thereof is also small. In such a case, it is effective to use the inclined fiber end face shown in FIG. 11, although the connector cannot be rotated.

According to the optical communication module of the present invention, the transmission light beam is emitted obliquely and diffused/scattered/absorbed, so that an intense laser beam which is harmful to human body is prevented from leaking to the outside of the optical communication module.

What is claimed is:

1. An optical communication module comprising:
an emission member for emitting a transmission light beam; and
a connection member for detachably connecting an optical fiber for external communication with the emission member, the connection member including a tubular accommodation part for coaxially receiving and fixing an end of the optical fiber to be connected,
wherein the emission member and the connection member are arranged such that the transmission light beam intersects with an optical axis of the optical fiber at a predetermined angle to enter an end face of the optical fiber when the optical fiber is connected and the transmission light beam collides with an inner wall of the accommodation part when the optical fiber is detached, and
wherein the inner wall of the accommodation part is designed to scatter the transmission light beam which collides therewith.

2. An optical communication module according to claim 1, wherein the end of the optical fiber includes an end face orthogonal to the optical axis of the optical fiber, and the predetermined angle is smaller than $\sin^{-1} (n1^2-n2^2)^{1/2}$ where a core and a clad of the optical fiber have refractive indices of n1 and n2, respectively.

3. An optical communication module comprising:
an emission member for emitting a transmission light beam; and
a connection member for detachably connecting an optical fiber for external communication with the emission member, the connection member including a tubular accommodation part of coaxially receiving and fixing an end of the optical fiber to be connected,
wherein the emission member and the connection member are arranged such that the transmission light beam intersects with an optical axis of the optical fiber at a predetermined angle to enter an end face of the optical fiber when the optical fiber is connected and the transmission light beam collides with an inner wall of the accommodation part when the optical fiber is detached, and wherein the accommodation part includes on its inner wall a light scattering member for scattering the transmission light which collides therewith.

4. An optical communication module according to claim 3, wherein the end of the optical fiber includes an end face orthogonal to the optical axis of the optical fiber, and the predetermined angle is smaller than $\sin^{-1}(n1^2-n2^2)^{1/2}$ where a core and a clad of the optical fiber refractive indices of n1 and n2, respectively.

* * * * *